(No Model.)
J. R. WADE.
STEAM TRAP.
No. 378,482. Patented Feb. 28, 1888.
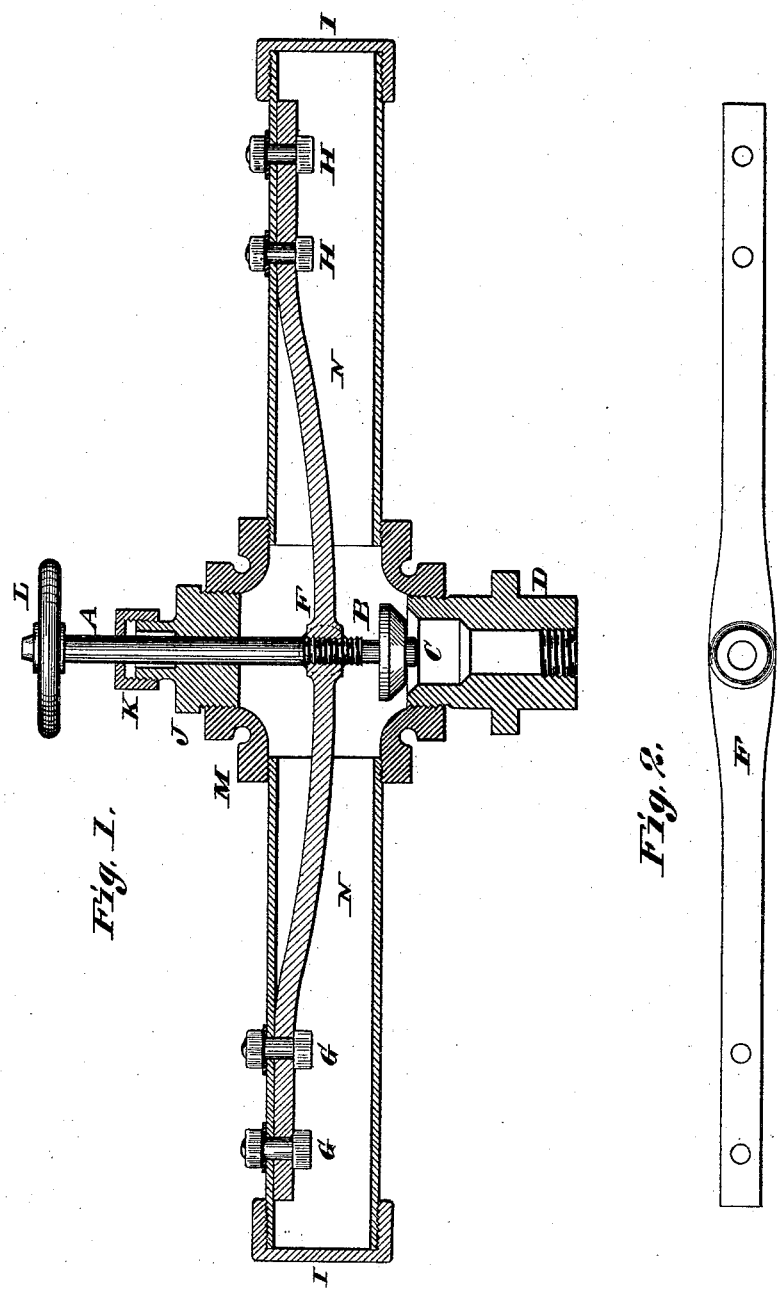

UNITED STATES PATENT OFFICE.

JAMES R. WADE, OF ST. LOUIS, MISSOURI.

STEAM-TRAP.

SPECIFICATION forming part of Letters Patent No. 378,482, dated February 28, 1888.

Application filed June 28, 1887. Serial No. 242,814. (No model.)

*To all whom it may concern:*

Be it known that I, JAMES R. WADE, a citizen of the United States, residing at the city of St. Louis, in the State of Missouri, have invented certain new and useful Improvements in Steam-Traps and in the Mode and Manner of their Operation; and I do hereby declare that the following is a full, clear, and exact description of the invention, which will enable others skilled in the art to which it appertains to make and use the same.

Figure 1 represents a sectional view of my invention, and Fig. 2 a plan view of expansion-plate.

In the drawings, A is the valve-stem.

B is the valve.

C is the valve-seat.

D is a brass nipple used as the seat of the valve at one end and the trap-discharge connection at the other.

F is the brass expansion-plate through which the valve-stem is screwed, and which may be adjusted on the outside of the trap by the wheel L.

G G and H H are bolts by which the expansion-plate is fastened at both ends to the body of the trap, thus compelling the expansion to spring the plate and close the valve.

I I are two caps screwed on threads of the pipe N N, forming the body of the trap.

M is a fitting known as a "cross," to which N N are screwed, making the body of the trap complete.

J is the valve trimmings.

K is the stuffing-box on valve-stem.

L is the wheel by which the valve is adjusted.

My invention is carried into effect in the following manner: The trap consists of steam-pipe and fittings applied in connection with a brass expansion-plate, which has absolute control of the valve. As the plate expands it moves the valve to its seat, and as the plate contracts it moves the valve in the opposite direction, which allows the water to pass from the trap through the discharge, the opening in the latter being governed by the change of temperature in the brass expansion-plate; or, in other words, the opening in the discharge will be according to the amount of condensation flowing to the trap.

The advantages of the trap are as follows: The valve is in the bottom of the trap. A very large valve is used, and as soon as the temperature of the trap cools, due to an accumulation of condensation, the valve is opened according to the change of temperature, and the water is allowed to flow from the trap as fast as it accumulates. This trap (which is operated entirely by the brass expansion-plate) is anti-freezing, for as the trap cools the valve opens, and as the discharge is from the bottom there can be nothing left to freeze when steam is turned off. To set the trap, open the valve wide; open by means of the valve-stem A until steam blows through freely, then close the valve down on its seat. This will be all the attention required, as the expansion-plate will then have entire control of the valve. The dotted circle in the side of the cross between F and B is the inlet. The outlet is in the brass nipple D. In connecting the trap it should be set level.

What I claim as new, and desire to secure by Letters Patent, is—

1. The combination, with the fitting M, of the pipes N N, secured to either side thereof and provided with caps on their outer ends, the expansion-plate secured to the pipes, the valve, and the valve-stem, the latter made adjustable in the expansion-plate, substantially as shown and described.

2. The combination, with the fitting M, provided with a removable valve-seat, of the pipes N N, secured to either side thereof and provided with caps on their outer ends, the expansion-plate secured to the pipes, the valve, and the valve-stem, the latter made adjustable in the expansion-plate, substantially as shown and described.

JAMES R. WADE.

Witnesses:
ALEXANDER YOUNG,
F. W. BURROWS.